(12) United States Patent
Gerber et al.

(10) Patent No.: US 7,054,426 B2
(45) Date of Patent: May 30, 2006

(54) METHOD FOR IMPLEMENTING REQUIREMENTS OF TELECOMMUNICATIONS SUBSCRIBERS

(75) Inventors: Heiko Gerber, Berlin (DE); Robert Hagen, Berlin (DE); Lorene Hoerner, Berlin (DE); Klaus Krause, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 730 days.

(21) Appl. No.: 10/079,809

(22) Filed: Feb. 22, 2002

(65) Prior Publication Data

US 2002/0123322 A1     Sep. 5, 2002

(30) Foreign Application Priority Data

Feb. 23, 2001    (DE) ................................ 101 09 899

(51) Int. Cl.
*H04M 3/42*    (2006.01)

(52) U.S. Cl. .............................. 379/201.12; 379/201.01

(58) Field of Classification Search ..............................
379/201.01–201.05, 201.12, 207.02, 243,
379/245; 705/7, 8, 11
See application file for complete search history.

(56) References Cited

U.S. PATENT DOCUMENTS

| 4,486,853 | A  | * | 12/1984 | Parsons ........................ 345/418 |
| 4,645,873 | A  | * | 2/1987  | Chomet ..................... 379/93.12 |
| 4,745,559 | A  | * | 5/1988  | Willis et al. ..................... 705/37 |
| 5,511,116 | A  | * | 4/1996  | Shastry et al. ......... 379/201.03 |
| 6,457,010 | B1 | * | 9/2002  | Eldering et al. ............... 707/10 |
| 6,724,875 | B1 | * | 4/2004  | Adams et al. ......... 379/201.01 |
| 6,856,676 | B1 | * | 2/2005  | Pirot et al. ............. 379/201.01 |

* cited by examiner

*Primary Examiner*—Benny Quoc Tieu
(74) *Attorney, Agent, or Firm*—Morrison & Foerster LLP

(57) ABSTRACT

The present invention relates to a method and a system for simple implementation of requirements of telecommunications subscribers for services which can be provided by a communications network. According to the invention, the method includes abstracting and classifying the requirements into a corresponding number of classes, subdividing the individual classes into one or more subclasses, and uniquely associating a subclass with one or more technical functional units which can be coupled to one another in a corresponding manner. The system includes a first catalog of classes, in which each requirement can be associated with one class, and a second catalog of technical functional units, in which each class is associated with one or more specific technical functional units.

10 Claims, No Drawings

METHOD FOR IMPLEMENTING REQUIREMENTS OF TELECOMMUNICATIONS SUBSCRIBERS

CLAIM FOR PRIORITY

This application claims priority to Application No. DE 10109899.5 which was published in the German language on Feb. 23, 2001.

TECHNICAL FIELD OF THE INVENTION

The present invention relates to a method for implementation of requirements from telecommunications subscribers for services which can be provided by a communications network.

BACKGROUND OF THE INVENTION

When new change requests occur from telecommunications subscribers or customers, it is necessary to analyze them in detail in order to implement them individually by means of one or more technical functional units (T features) which can be coupled to one another appropriately. This procedure involves a large amount of time, since the functional units (T features) which can be used for implementation have to be searched for repeatedly (from a range of technical functional units) for each change request and for each new requirement for a service which can be provided by the telecommunications network. These T features must then in turn be appropriately coupled to one another.

The telecommunications market generally moves at high speed, and the number of change requests relating to the most varied IN services which can be provided by the communications network is continuing to grow. Hence, it is important to deal with these requests as quickly as possible in order to keep up with the competition, which is also rapidly growing, on the telecommunications market.

SUMMARY OF THE INVENTION

In one embodiment of the invention, there is a method for implementation of requirements of telecommunications subscribers for services which can be provided by a communications network. The method includes, for example, abstracting and classifying the requirements into a corresponding number of classes, subdividing the individual classes into at least one subclass, and uniquely associating a subclass with at least one technical functional unit configured for coupling to one another in a corresponding manner.

In another aspect of the invention, the method includes executing at least one test run of the at least one technical functional unit which has been correspondingly associated.

In another aspect of the invention, the method includes abstracting, classifying, subdividing and uniquely associating are verified by one or more simulation runs.

In another embodiment of the invention, there is a system for implementation of requirements of telecommunication subscribers for services which can be provided by a communications network. The system includes, for example, a first catalog of classes, in which each requirement can be associated with one class, and a second catalog of technical functional units, in which each class is associated with one or more specific technical functional units.

In another aspect of the invention, the classes are each subdivided into one or more subclasses and each of the subclasses are associated with one or more specific technical functional units.

In another aspect of the invention, each class is associated with at least one implemented, defined model.

In still another aspect of the invention, each technical functional unit is associated with an implemented, defined model.

DETAILED DESCRIPTION OF THE PREFERRED EMBODIMENTS

One embodiment of the invention relates to a method for implementation of requirements from telecommunications subscribers for services which can be provided by a communications network. In a dialog with telecommunications subscribers, i.e. with direct users, with the service providers or with the network operators, change requests relating to the services which can be provided by the communications network constantly occur. These services relate primarily to IN services, e.g. services which go beyond the pure transmission service and supplementary service features. In general, these services which can be provided by the intelligent network (IN) are implemented by the interaction of a number of technically intrinsically closed functional units. These technical functional units, also referred to as T features, are integrated in an appropriate manner in the intelligent network.

The invention also provides a simple and rapid method for implementing the requirements of telecommunications subscribers for services which can be provided by a communications network.

According to another embodiment of the invention, a method is provided for simple implementation of requirements from telecommunications subscribers for services which can be provided by a communications network, the method including at least the following:
a. abstraction and classification of the requirements into a corresponding number of classes (R features),
b. subdivision of the individual classes (R features) into one or more subclasses (usages),
c. unique association of a subclass with one or more technical functional units (T features) which can be coupled to one another in a corresponding manner.

While a specific change request or a specific requirement from the telecommunications subscribers often results in the provider or the network operators being confronted with new work, and the necessity to analyze the possible technical feasibility of this requirement on an individual basis, it is now possible to relocate each specific requirement in a class, or an R feature (requirement feature). According to the invention, the change requests which have already occurred are first abstracted, i.e. they are viewed separately from a specific service. They can then be classified and cataloged independently of the service. According to the invention, this results in a specific number of classes, so-called R features (requirements features) which can be enumerated. The R features frequently form a type of "generic class" and can in general be differentiated or specified, with a specific number of subclasses, so-called usages, crystallizing out in each case. This results in a catalog of requirements (R features) similar to a building kit, comprising various Lego blocks, with whose aid the newly occurring change requests from the telecommunications subscribers can be "built up" or composed of R features. Any remaining proportion of the change requests which cannot be covered by R features is implemented individually. Depending on the importance of the remaining portion, it may be necessary to assess whether there is any point in including them as a new R feature in the classification.

The R features and the corresponding subclasses can be implemented by one or more technical functional units or T features, which are coupled to one another. According to the invention, each subclass is associated, in order to implement it, with one or more T features which can be coupled to one another in a corresponding manner. The developer then couples the defined T features to one another, if necessary, and integrates or locates them at the desired point within the intelligent network. It is thus possible to implement specific requirements from the telecommunications subscribers very quickly and simply, once they have been abstracted and organized, into the catalog of R features, by reading the correspondingly associated T features.

The development process and the implementation of the services preferably involves a sort of phase model (Service Life Cycle). In general, the development process can be subdivided into the following 7 phases:

Phase 1: specification of the requirement produced by the telecommunications subscriber Phase 2: checking the validity of the requirement (Requirement Validation)

Phase 3: specification of the functional service, that is to say "what function must be provided in order to satisfy the stated requirement?"

Phase 4: verification of the specification

Phase 5: service development

Phase 6: service acceptance

Phase 7: service maintenance.

In Phase 1, the requirements from the subscribers, from the providers and from the network operators for various services and their management are first collated. Next, the range of defined R features can be seen from the classification process carried out according to the invention on the basis of the method according to the invention, and the stated requirements are organized appropriately. This results in a simple association between the stated requirements and specific R features which can be implemented and are preferably independent of the service. One advantage of this procedure is that, after Phase 1, there is no longer any need to do anything involving individual requirements, since the work involves requirements which can be combined for a number of services. Consequently, the implementation of the corresponding requirements is also feasible, by and large independently of the service and more universally.

In Phase 2, the requirements are checked to see whether they are "worthwhile" (that is, the technical or feasibility aspects), the economic aspects (e.g. costs and performance) and the functional aspects are exposed. Market simulations and customer workshops may be used to carry out this phase. The effect on the mutually interacting systems and organizations is analyzed. In the end, this results in a detailed definition of the requirement which is actually desired and is to be implemented. At the same time, this results at a very early stage of development in an initial estimate of the development costs involved, as well as the introduction costs and resultant ongoing costs for implementation of the requirement in corresponding IN services in the intelligent network. The requirement or the service idea should preferably be addressed, specified and verified together with the respective telecommunications subscriber directly on site. Each subclass or each usage can be associated with a well-defined, already-tested and implemented model. For simulation of a service, which may be composed of a specific number of usages based on the previous analysis, the corresponding models which can be associated with the individual usages are now joined together in a simulation tool to form an overall model, and it is possible to check whether the requirement or the service idea has been covered. It is thus possible to clear up any possible misunderstandings at a very early stage. That is, even before the actual implementation of the requirement by means of technical functional units. At the same time, such simulations allow any other preferences which may exist for a service to be installed at the same time.

Phase 3 covers the actual transition from the R features to the T features. In the process, a detailed analysis is carried out as to what should actually be implemented functionally in the end by the stated requirement. A direct relationship is produced between the requirement (R feature) and the functional implementation (T feature). The T feature or features which is or are to be coupled to one another, in terms of their function, satisfy the stated requirement. At the same time, this association process results in more detailed specification in terms of the management of a service which satisfies the stated requirement. The interaction with external systems can be analyzed and assessed.

According to one aspect of the invention, the classification of the R features results in a clear, exact and unambiguous mapping rule from the R features to the T features. This mapping rule simplifies and speeds up the entire development process.

In Phase 4, the correct association is verified by tests based on models, e.g. checks carried out to determine whether the functional specification from Phase 3 also actually satisfies the stated requirements for the corresponding service or services. During the verification process, an estimate can at the same time be made of the performance of the functional implementation. Such a verification process is preferably carried out by simulations. According to the invention, there is one implemented, well-defined model for each T feature. In a similar way to the simulation at the R features level, as has been explained with reference to Phase 2, the individual models of the T features in question are coupled in a corresponding manner to one another to form an overall model for verification of the functionality of the correspondingly coupled T features, in order to simulate the desired service at the T features level, and thus to allow it to be checked.

Finally, Phases 5, 6 and 7 include the actual implementation of the corresponding R features. Test runs are carried out in Phase 6, preferably in the appropriate network environment. Both service applications and management applications are inspected. Any faults or errors that are found are corrected. Phase 7 covers both the service maintenance and the management maintenance.

What is claimed is:

1. A method for implementation of requirements of telecommunications subscribers for services provided by a communications network, comprising:

abstracting and classifying the requirements into a corresponding number of classes;

subdividing the individual classes into at least one subclass; and uniquely associating a subclass with at least one technical functional unit configured for coupling to one another in a corresponding manner.

2. The method as claimed in claim 1, further comprising:

executing at least one test run of the at least one technical functional unit which has been correspondingly associated.

3. The method as claimed in claim 1, wherein abstracting, classifying, subdividing and uniquely associating are verified by one or more simulation runs.

4. A system for implementation of requirements of telecommunication subscribers for services provided by a communications network, comprising:
- a first catalog of classes, in which each requirement can be associated with one class; and
- a second catalog of technical functional units, in which each class is associated with one or more specific technical functional units.

5. The system as claimed in claim 4, wherein the classes are each subdivided into one or more subclasses and each of the subclasses are associated with one or more specific technical functional units.

6. The system as claimed in claim 4, wherein each class is associated with at least one implemented, defined model.

7. The system as claimed in claim 4, wherein each technical functional unit is associated with an implemented, defined model.

8. The system as claimed in claim 5, wherein each class is associated with at least one implemented, defined model.

9. The system as claimed in claim 5, wherein each technical functional unit is associated with an implemented, defined model.

10. The system as claimed in claim 6, wherein each technical functional unit is associated with an implemented, defined model.

* * * * *